(12) United States Patent
Berruet et al.

(10) Patent No.: US 9,200,609 B2
(45) Date of Patent: Dec. 1, 2015

(54) TORQUE TRANSMISSION MECHANISM

(71) Applicants: Nicolas Berruet, Artannes sur Indre (FR); Charles Chambonneau, Joué lès Tours (FR); François Champalou, Chaumont-sur-Loire (FR)

(72) Inventors: Nicolas Berruet, Artannes sur Indre (FR); Charles Chambonneau, Joué lès Tours (FR); François Champalou, Chaumont-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/326,785

(22) Filed: Jul. 9, 2014

(65) Prior Publication Data

US 2015/0013495 A1     Jan. 15, 2015

(30) Foreign Application Priority Data

Jul. 9, 2013   (EP) ..................................... 13175780

(51) Int. Cl.
   *F02N 15/02*     (2006.01)
   *F16D 41/00*     (2006.01)

(52) U.S. Cl.
   CPC .............. *F02N 15/022* (2013.01); *F16D 41/00* (2013.01); *F02N 15/023* (2013.01); *F02N 2250/08* (2013.01); *Y10T 74/134* (2015.01)

(58) Field of Classification Search
   CPC . F02N 15/022; F02N 15/023; F02N 2250/08; F16D 41/00; Y10T 74/134

USPC .................................................... 123/179.25
See application file for complete search history.

(56) References Cited

U.S. PATENT DOCUMENTS

| | | | |
|---|---|---|---|
| 2009/0008190 A1 * | 1/2009 | Suzuki et al. .................. | 184/6.3 |
| 2009/0288295 A1 * | 11/2009 | Suzuki et al. ................ | 29/893.3 |
| 2015/0014119 A1 * | 1/2015 | Berruet et al. .............. | 192/41 R |

FOREIGN PATENT DOCUMENTS

WO       20070105109 A2      9/2007

* cited by examiner

*Primary Examiner* — Jason Shanske
(74) *Attorney, Agent, or Firm* — Bryan Peckjian; SKF USA Inc. Patent Dept.

(57) ABSTRACT

A torque transmission mechanism for an internal combustion engine, adapted to transmit a starting torque from a starter motor to a crankshaft of the internal combustion engine. A ring gear of the mechanism transmits the starting torque, and a one-way clutch (including an inner ring and an outer ring) disposed between the ring gear and the crankshaft. The ring gear comprises lubrication holes allowing lubricant to transfer from the internal combustion engine towards the one-way clutch. The torque transmission mechanism comprising at least one sealing element adapted to prevent lubricant from passing between an outer surface of the one-way clutch outer ring and a ring gear inner surface. The one-way clutch outer ring comprises a chamfered surface inclined with respect to a central axis of the mechanism and diverging respective to the central axis of the mechanism from the lubrication holes of the ring gear towards the sealing element.

7 Claims, 7 Drawing Sheets

TORQUE TRANSMISSION MECHANISM

CROSS REFERENCE TO RELATED APPLICATION

This is a U.S. Non-Provisional Patent Application claiming the benefit of European Union Patent Application Number 13175780.9 filed on 9 Jul. 2013 (9 Jul. 2013), which is incorporated herein by reference in its entirety.

FIELD OF THE INVENTION

The invention relates to a torque transmission mechanism for an internal combustion engine.

BACKGROUND OF THE INVENTION

Torque transmission mechanisms for starter motors of internal combustion engines include a one-way clutch and a bearing for allowing rotation of a gear ring to which the starting torque is transmitted. The one-way clutch comprises an outer ring fast in rotation to a crankshaft of the internal combustion engine, and an inner ring fast in rotation to a ring gear to which starting torque is delivered by pinion mesh. A dynamic seal is provided in a place where the ring gear and the outer ring of the one-way clutch rotate relative to each other so that lubricant oil coming from the engine through lubrication holes of the ring gear does not get outside of the torque transmission mechanism.

Because the outer diameter of the outer ring of the one way clutch is usually superior to the diameter of sealing elements used for crankshafts, the linear speeds at the contact points between the sealing element and the ring way cause overheating of the seal and harm its efficiency, eventually leading to failures.

It is known to provide the torque transmission mechanism with oil projection systems to bring lubricant towards the sealing elements to prevent heating, or to use seals made of elastomeric materials such as PTFE. These solutions imply more complex assembly steps and prove to be costly.

BRIEF DESCRIPTION OF THE INVENTION

The aim of the invention is to provide a new torque transmission mechanism for an internal combustion engine, in which lubricant is sealed in a more reliable and simple way than in the prior art.

To this end, the invention concerns a torque transmission mechanism for an internal combustion engine, adapted to transmit a starting torque from a starter motor to a crankshaft of the internal combustion engine, the torque transmission mechanism comprising a ring gear that transmits the starting torque and a one-way clutch disposed between the ring gear and the crankshaft, the one-way clutch including an inner ring and an outer ring, the ring gear comprising lubrication holes adapted to allow lubricant to go from the internal combustion engine towards the one-way clutch, the torque transmission mechanism comprising at least one sealing element adapted to prevent lubricant from passing between an outer surface of the outer ring of the one-way clutch and an inner surface of the ring gear. This torque transmission mechanism is characterized in that the outer ring of the one-way clutch comprises a chamfered surface inclined with respect to a central axis of the torque transmission mechanism, the chamfered surface diverging with respect to the central axis of the torque transmission mechanism from the lubrication holes of the ring gear towards the sealing element.

Thanks to the invention, lubricant circulates in the vicinity of the sealing element, preventing overheating of the sealing element under effect of the high linear speed that occurs during relative rotation of the outer ring of the one-way clutch and the ring gear. This technical solution is far less complex and costly than those of the prior art.

According to further aspects of the invention which are advantageous but not compulsory, such a torque transmission mechanism may incorporate one or several of the following features:

The chamfered surface is located at the intersection between the outer surface and an axial surface of the outer ring of the one-way clutch, said axial surface facing the ring gear parallely to the central axis of the torque transmission mechanism.

The intersection between the chamfered surface and the axial surface is at a distance to the central axis, which is inferior to the distance to the central axis of an edge of the lubrication hole.

BRIEF DESCRIPTION OF DRAWINGS

The invention will now be explained in correspondence with the annexed figures, as an illustrative example. In the annexed figures.

DETAILED DESCRIPTION OF EMBODIMENTS OF THE INVENTION

Figure 1:
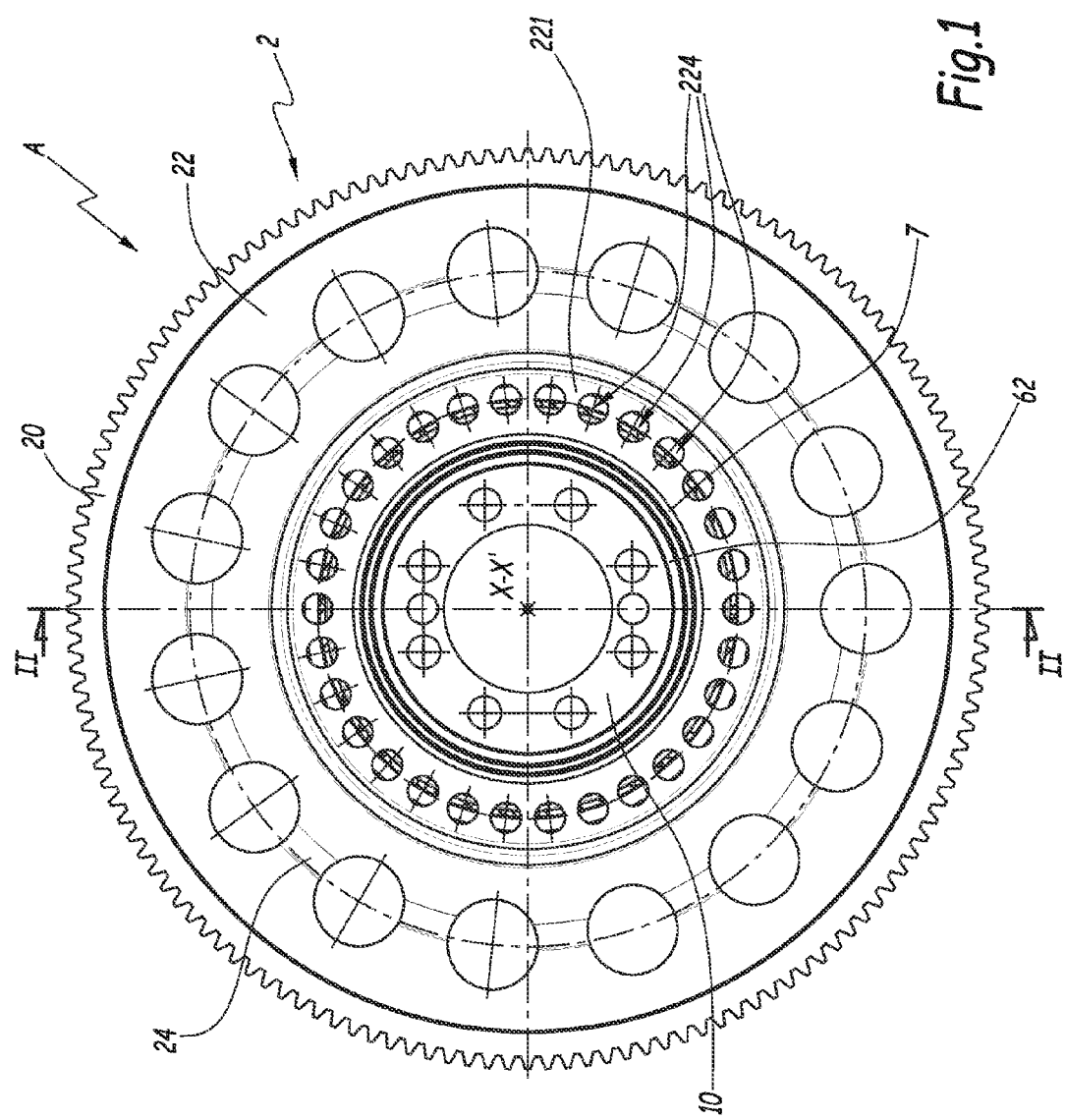
FIG. 1 is a front view of a torque transmission mechanism according to a first embodiment of the invention.
Figure 2:
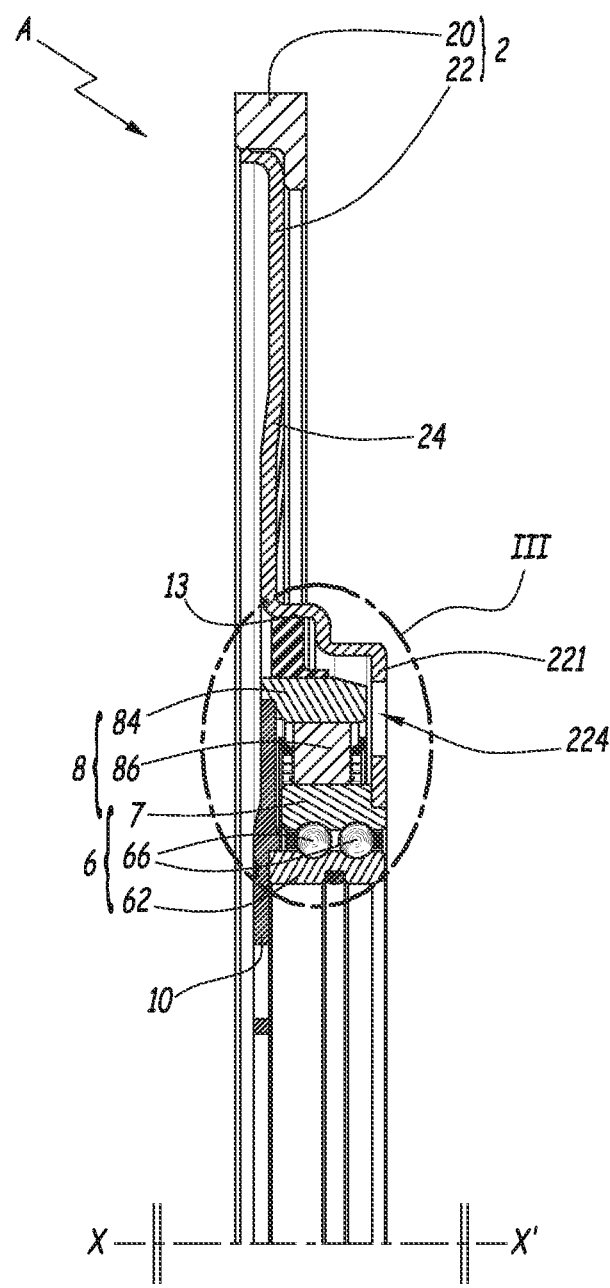
FIG. 2 is a sectional view, along plane II-II and at a larger scale, of an upper half of the torque transmission mechanism of FIG. 1.

The torque transmission mechanism A represented on FIGS. 1 to 7 comprises a ring gear 2 that is driven by a non-shown pinion of a non-shown starter motor. Ring gear 2 is rotatable with respect to a crankshaft 4 of a non-shown internal combustion engine. For the sake of simplicity and clarity, shaft 4 is shown only on FIGS. 3 and 4, in dashed lines. Rotation of ring gear 2 with respect to crankshaft 4 is allowed by a rolling bearing 6 including an inner ring 62 adapted to accommodate crankshaft 4 and which is coupled in rotation with crankshaft 4, an outer ring including two raceway tracks 70a realized on an inner surface 70 of a tubular part 7, which is coupled in rotation with ring gear 2, and rolling elements, such as balls 66, located between inner ring 62 and raceway tracks 70a.

Torque transmission mechanism A also includes a one-way clutch 8, which includes an inner ring formed by an outer surface 72 of tubular part 7, an outer ring 84 and sprags 86 mounted in a cage 88 located between ring 84 and outer surface 72.

Tubular part 7 is coupled in rotation with ring gear 2, so that the starting torque delivered by the starter motor is transmitted to tubular part 7 via ring gear 2. The inner ring of one-way clutch 8 and the outer ring of rolling bearing 6 are formed by tubular part 7, which is monolithic. This permits to reduce the number of parts of torque transmission mechanism A and the number of assembling steps of its manufacturing method. Tubular part 7 can be manufactured using a standardized bearing ring grinding process, which significantly eases its manufacturing.

Outer ring 84 is coupled in rotation with crankshaft 4 thanks to a front plate 10. Front plate 10 comprises an outer circular edge 101 mounted against a radial inner surface 840 of outer ring 84.

Front plate 10 comprises, on an inner surface 103, which faces bearing 6, a cylindrical recess 105 in which inner ring 62 is mounted. As represented on FIG. 3, a lateral surface 620 of inner ring 62 abuts against a bottom 106 of recess 105, while an outer cylindrical surface 622 of inner ring 62 is mounted against recess 105. Bottom 106 delimits a central wall 102 of front plate 10.

Front plate 10 is welded to inner ring 62 at the interface between bottom 106 and lateral surface 620. Inner ring 62 is coupled in rotation with crankshaft 4 by welding inner ring 62 to front plate 10 along a direction represented by arrow F1, which is parallel to a central axis X-X' of inner ring 62, which also corresponds to the rotation axis of torque transmission mechanism A. Front plate 10 is attached to an end of crankshaft 4 by screws or bolts. Alternatively, front plate 10 can also be crimped onto inner ring 62, or front plate 10 can be assembled to inner ring 62 in a reversible manner, with fastening means such as elastic rings.

Figure 3:
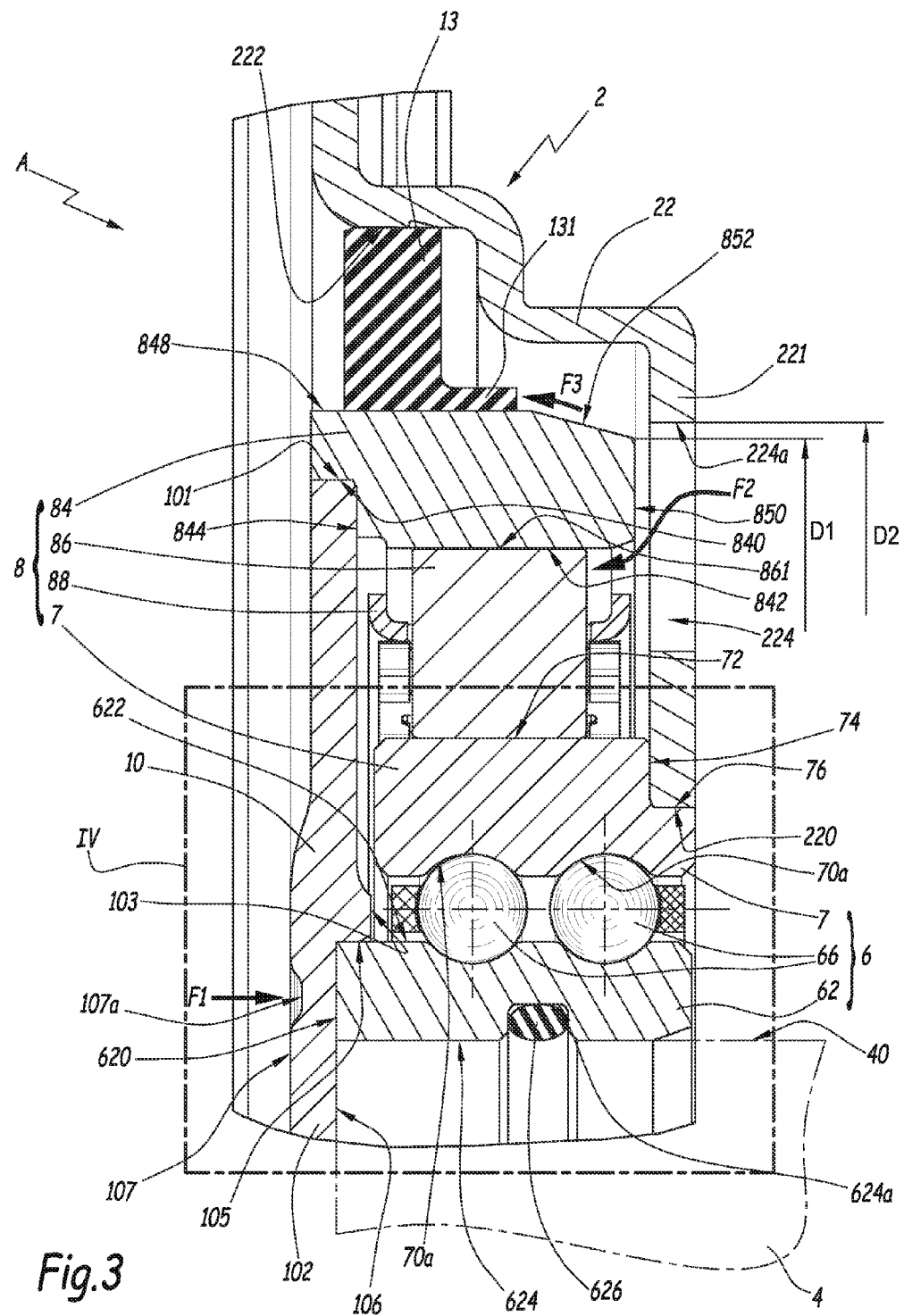
FIG. 3 is a view, at a larger scale, of detail III on FIG. 2.
Figure 4:
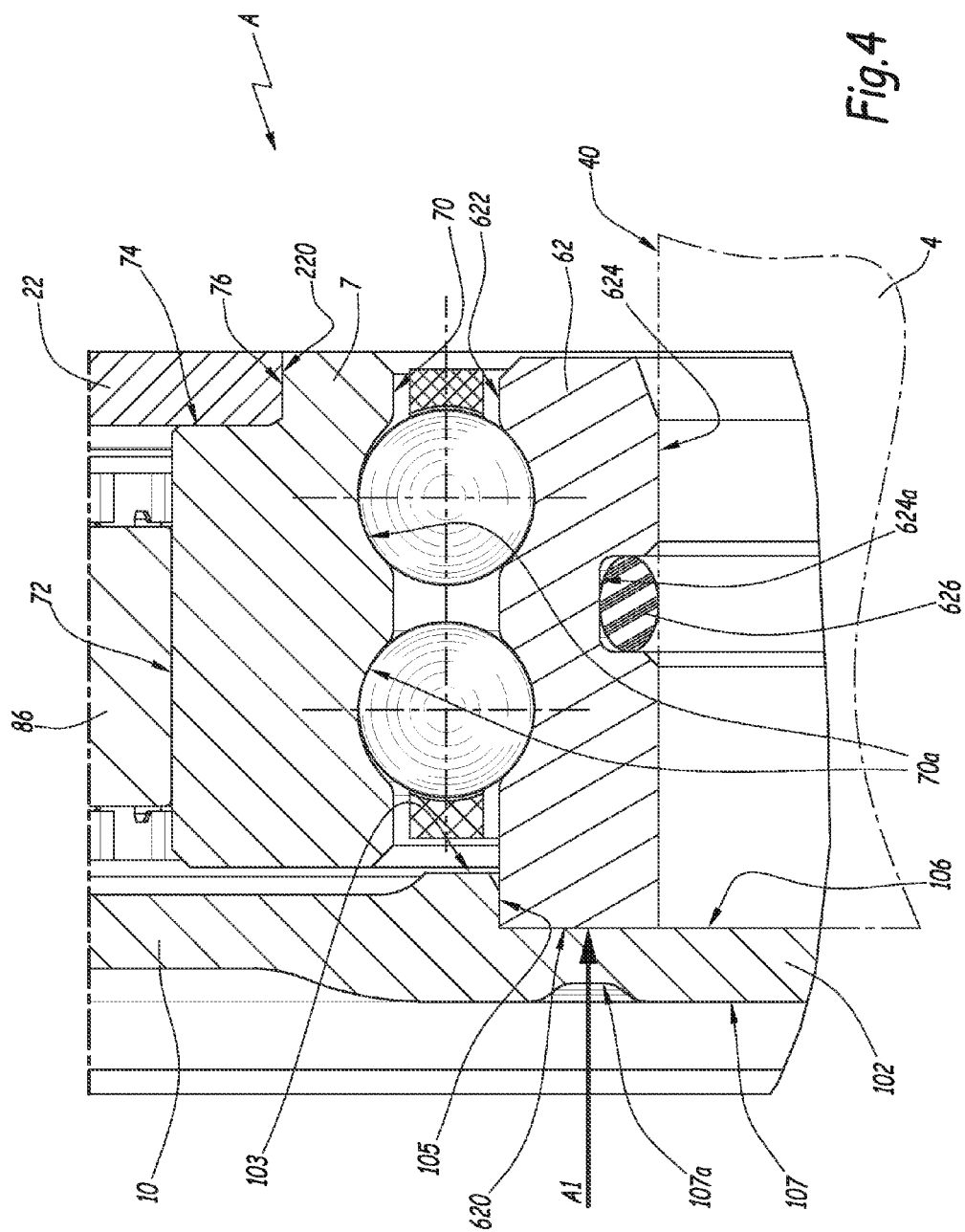
FIG. 4 is a view, at a larger scale, of detail IV on FIG. 3.
Figure 5:
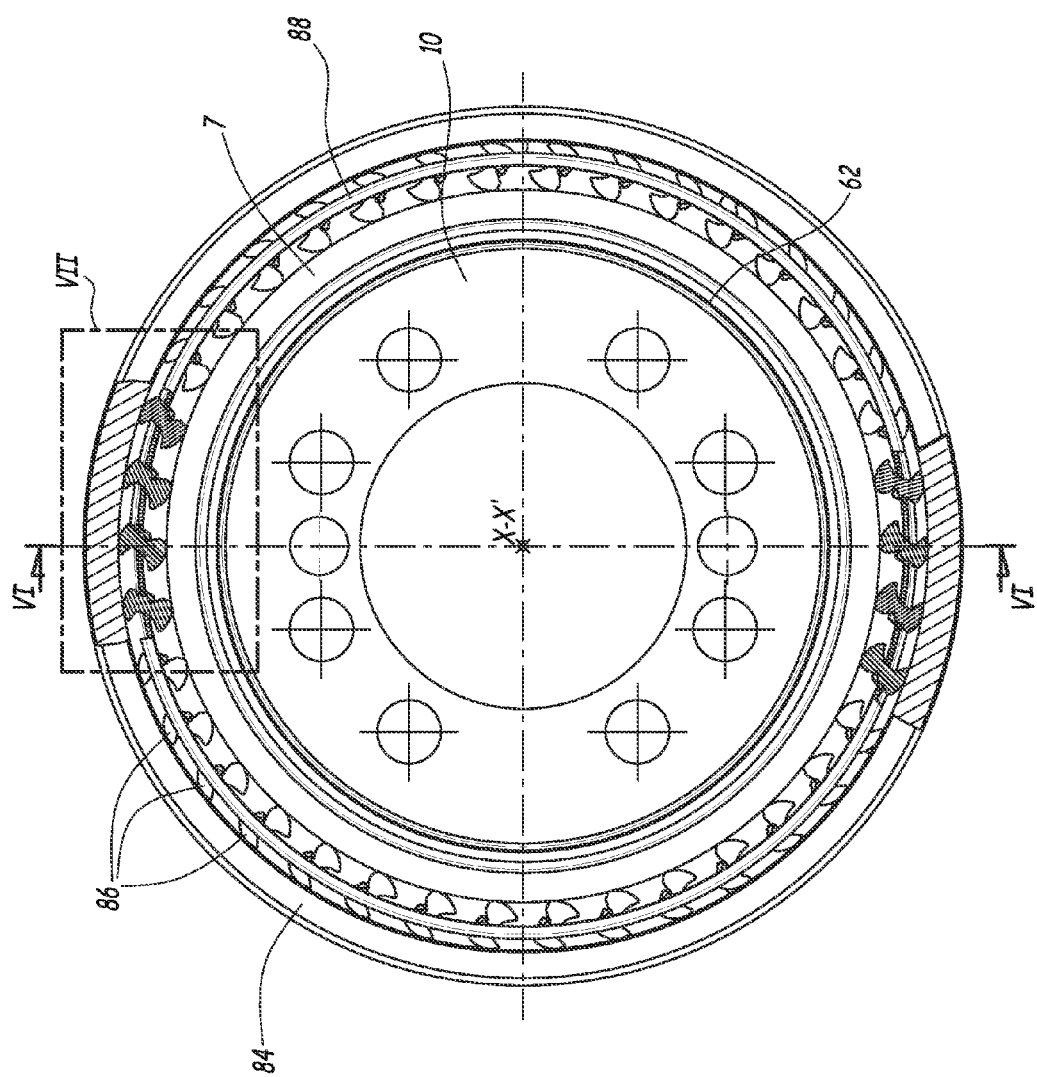
FIG. 5 is a partially sectioned front view of a one-way clutch belonging to the torque transmission mechanism of FIG. 1.

On an outer surface 107 of front plate 10 opposite to inner surface 103, front plate 10 comprises an annular recess 107a, which forms a cavity aligned, on the sectional view of FIG. 3, with welding direction F1. Front plate 10 is welded to inner ring 62 on several points of annular recess 107a, so that no bulge of matter is formed by the welding on outer surface 107. This permits to mount other devices or auxiliary equipments directly against outer surface 107 and to improve the axial compactness of torque transmission mechanism A.

Inner surface 103 is welded to lateral surface 620 through central wall 102 by laser welding. Preferably, front plate 10 is welded to inner ring 62 along the whole circumference of inner ring 62. This provides a tightness seal against oil leakages that could occur from the internal combustion engine via crankshaft 4.

Inner ring 62 comprises an inner cylindrical surface 624, on which a groove 624a is realized. A toric sealing gasket 626 is housed in groove 624a, so that it lies against an outer peripheral surface 40 of crankshaft 4. Sealing gasket 626 provides a further sealing together with the welding between front plate 10 and inner ring 62.

Outer ring 84 is manufactured using the following process: outer ring 84 is first manufactured by soft machining, for example by forging, as a forged metal part made of case hardening steel, which contains a relatively low equivalent carbon content, that is to say a maximal equivalent carbon content of 0.7. Then outer ring 84 undergoes a carburizing step. This operation consists in enriching in carbon some surfaces of outer ring 84, so that superficial areas of outer ring 84 contain a higher quantity of carbon. In a further step, outer ring 84 is hardened on the surfaces in which carbon has been added, so as to harden these surfaces. This hardening step may consist of austenitizing, quenching and tempering. In a further step, outer ring 84 is hard machined, for instance grinded or hard turned, so that an inner surface 842 of outer ring 84, with which sprags 86 are adapted to cooperate, has the correct geometrical properties.

In a further step, front plate 10 is made of a standard low equivalent carbon content in a stamping manufacturing process, as it does not need specific properties except being appropriate for welding. In a final step, front plate 10 and outer ring 84 are assembled. Outer ring 84 and front plate 10 are preferably welded to each other, by welding surfaces 840 and 101 together and/or by welding an axial surface 844 of outer ring 84 to an axial surface 102 of front plate 10.

Alternatively, front plate 10 can also be crimped onto outer ring 84, or front plate 10 can be assembled to outer ring 84 in a reversible manner, with fastening means such as elastic rings.

According to a non-shown embodiment of the invention, front plate 10 may also be assembled to outer ring 84 by sticking, gluing, press fit mounting or cooperating splines provided on front plate 10 and outer ring 84.

Outer ring 84 is preferably carbon enriched by vacuum carburizing. This permits to prevent carbon from being added at places where it is not wanted, for example on surfaces 840 and 844 which must be suitable for welding and therefore not contain a too high amount of carbon.

According to an optional aspect of the invention, outer ring 84 is obtained by slicing portions of a unique case hardened steel tube. After soft machining and case carburizing of the unique steel raw part in the form of a tube, and either before or after the hardening step, the tube is separated either by soft or hard slicing, in longitudinal portions each forming a ring 84. As the axial surfaces of the rings face each other after the slicing step, the carburizing does not add carbon on the axial surfaces. This permits not to add carbon on non-needed surfaces, where welding is likely to take place.

According to an alternative aspect of the invention, outer ring 84 can be carbon enriched by atmospheric carburizing. In such a case, a further step is performed between carburizing and hardening of outer ring 84. This step consists in machining outer ring 84 to eliminate carbon on surfaces where it is not wanted.

As an optimal aspect, the surfaces where carbon enrichment is not wanted may be painted before carburizing, so that these surfaces do not receive carbon and remain suitable for welding. In such a case, paint is eliminated, for example by vibration, after hardening.

Sprags 86 are mounted in cage 88 so that they can rotate with respect to cage 88 around a rotation axis X86 which is substantially parallel to axis X-X'. Each sprag 86 is inserted in a hole 881 of cage 88. Each sprag 86 comprises a first cam surface 861 that cooperates with inner surface 842 of outer ring 84, and a second cam surface 863 that cooperates with outer surface 72 of tubular part 7. Cam surfaces 861 and 863 have a circular shape and are substantially opposed with respect to axis X86 and cage 88.

First cam surface 861 of each sprag 86 is urged against inner surface 842 by a leaf spring 90 fixed to cage 88. Each leaf spring 90 exerts an elastic force which tends to rotate a corresponding sprag 86 around axis X86 so that first cam surface 861 is kept in contact with inner surface 842.

Figure 7:
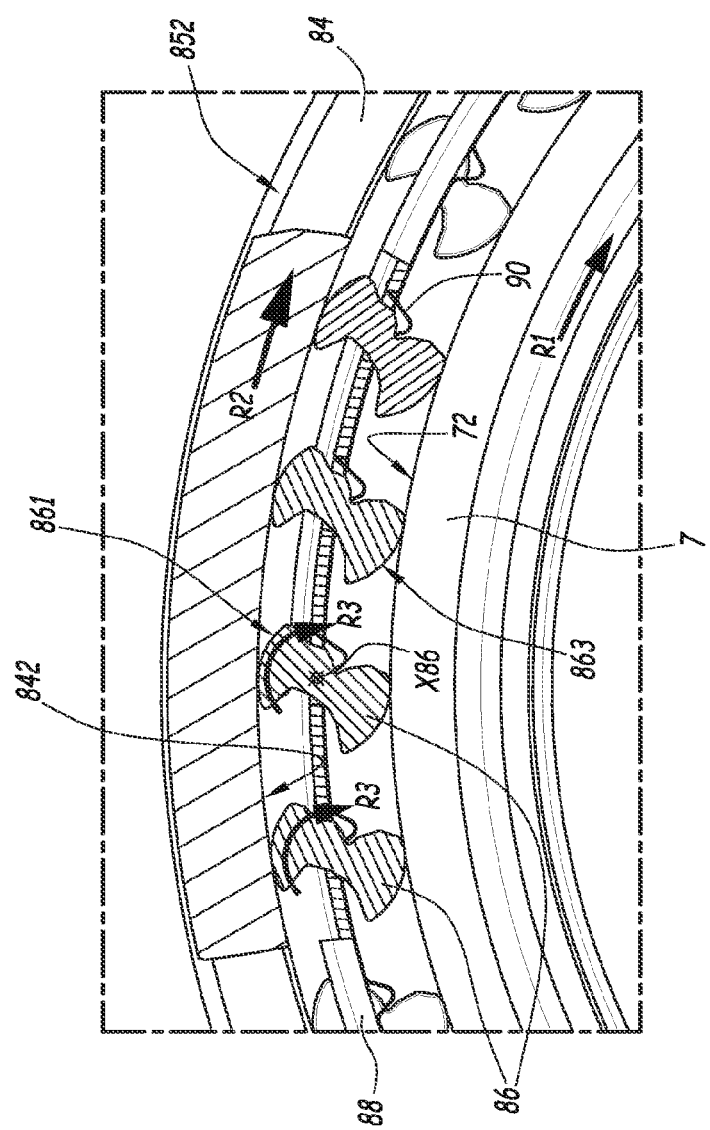
FIG. 7 is a view at a larger scale of detail VII on FIG. 5.
Figure 6:
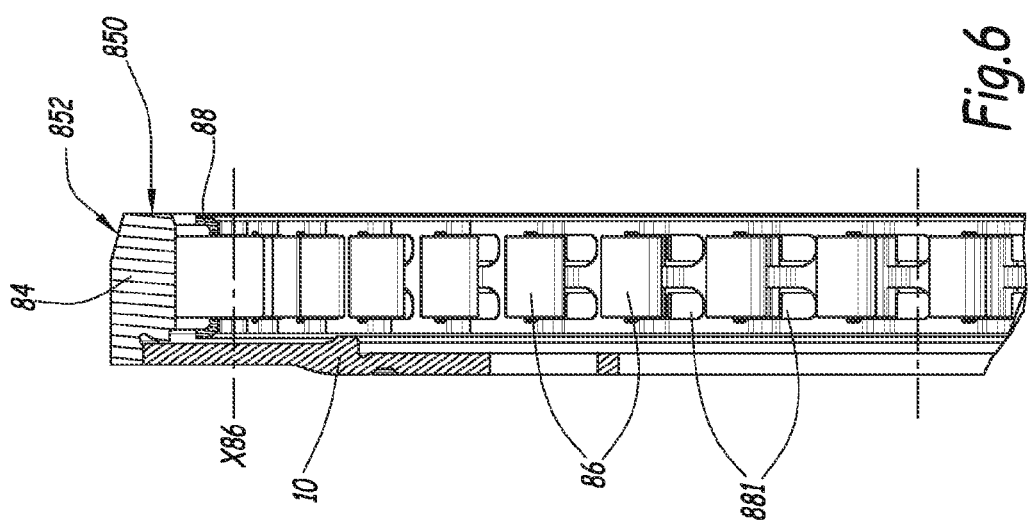
FIG. 6 is a sectional view along plane VI-VI of the one-way clutch of FIG. 5.

Cam surfaces 861 and 863 are designed in such a way that when a starting torque is delivered to ring gear 2 and when tubular part 7 rotates in the direction of arrow R1 on FIG. 7, the starting torque is transmitted to outer ring 84 via sprags 86 so as to drive crankshaft 4 and start the internal combustion engine. When internal combustion engine reaches its nominal rotation speed range, the rotation speed of crankshaft 4 becomes superior to the rotation speed of gear ring 2, resulting in outer ring 84 and tubular part 7 rotating at different rotation speeds. Outer ring 84 begins to rotate with respect to tubular part 7 in the direction of arrow R2 on FIG. 7. This provokes a rotation of sprags 86 around axis X86 in the direction of arrow R3. Second cam surfaces 863 slide on outer surface 72 so that no torque is transmitted from outer ring 84 to tubular part 7 via sprags 86. This prevents ring gear 2 from rotating at too high rotation speeds and avoids damages on the starter motor.

As one-way clutch 8 only comprises one cage 88, the rotation possibility of sprags 86 around axis X86 make it possible for second cam surfaces 863 to lose contact with outer surface 72 under action of the rotation of outer ring 84. This permits to reduce friction in one-way clutch 8, in comparison to the torque transmission mechanisms of the prior art. Moreover, this permits to reduce the fuel consumption of the vehicle in which torque transmission mechanism A is integrated.

Ring gear 2 includes a gear side portion 20 to which a starter torque is transmitted from the starter motor via gear mesh. Ring gear 2 also comprises a flange 22 on which gear side portion 20 is mounted. Flange 22 comprises an inner edge 220 located on the side of axis X-X' and which is fixed to tubular part 7.

Tubular part 7 comprises a shoulder that defines an axial surface 74 and a cylindrical surface 76, against which inner edge 220 of flange 22 is mounted.

Alternatively, flange 22 can also be crimped onto tubular part 7. Flange 22 can also be assembled to tubular part 7 in a reversible manner, with fastening means such as elastic rings.

The fact that flange 22 joins tubular part 7 which forms the inner ring of one-way clutch 8 permits to separately produce flange 22 by stamping, and tubular part 7 by a nearly standard bearing ring manufacturing process.

According to a non-shown embodiment, the inner ring of one-way clutch 8 and the outer ring of bearing 6 may be formed as separate parts. In such a case, the manufacturing of the inner ring of one-way clutch 8 can be standardized, which further simplifies the manufacturing process of torque transmission mechanism A.

Outer ring 84 comprises an outer surface 848 that faces an inner cylindrical surface 222 of flange 22. Outer ring 84 also comprises an axial surface 850 which faces, along axis X-X', an inner portion 221 of flange 22. Between surfaces 848 and 850, outer ring 84 comprises a chamfered surface 852 which diverges from axis X-X' towards front plate 10.

Inner portion 221 comprises at least one lubrication hole 224 which permits lubrication oil coming from the internal combustion engine to get in the one-way clutch and lubricate it, as shown by arrows F2 on FIG. 3. In order to seal the torque transmission mechanism so that no lubricant can get outside between outer surface 848 and an inner surface 222, a sealing gasket 13 is mounted between these two surfaces. However, as the diameter of outer surface 848 is relatively large, friction between a sealing lip 131 of sealing gasket 13 can be very high because of the high linear speed resulting from the relative rotation between gear ring 2 and outer ring 84. Thanks to chamfered surface 852, lubricant coming through lubrication hole 224 is driven along arrow F3 in the vicinity of sealing lip 131, so that heating of sealing gasket 13 because of friction is reduced and does not damage sealing gasket 13.

The intersection between surfaces 850 and 852 is at a distance D1 from axis X-X'. On the other hand, an edge 224a of lubrication hole 224 is at a distance D2 of axis X-X'. Distance D1 is inferior to distance D2, so that lubrication hole 224 is partially axially aligned with chamfered surface 852 and that a flow of lubricant goes through lubrication hole 224 directly to chamfered surface 852 and, along this surface, towards sealing gasket 13.

Figure 8:
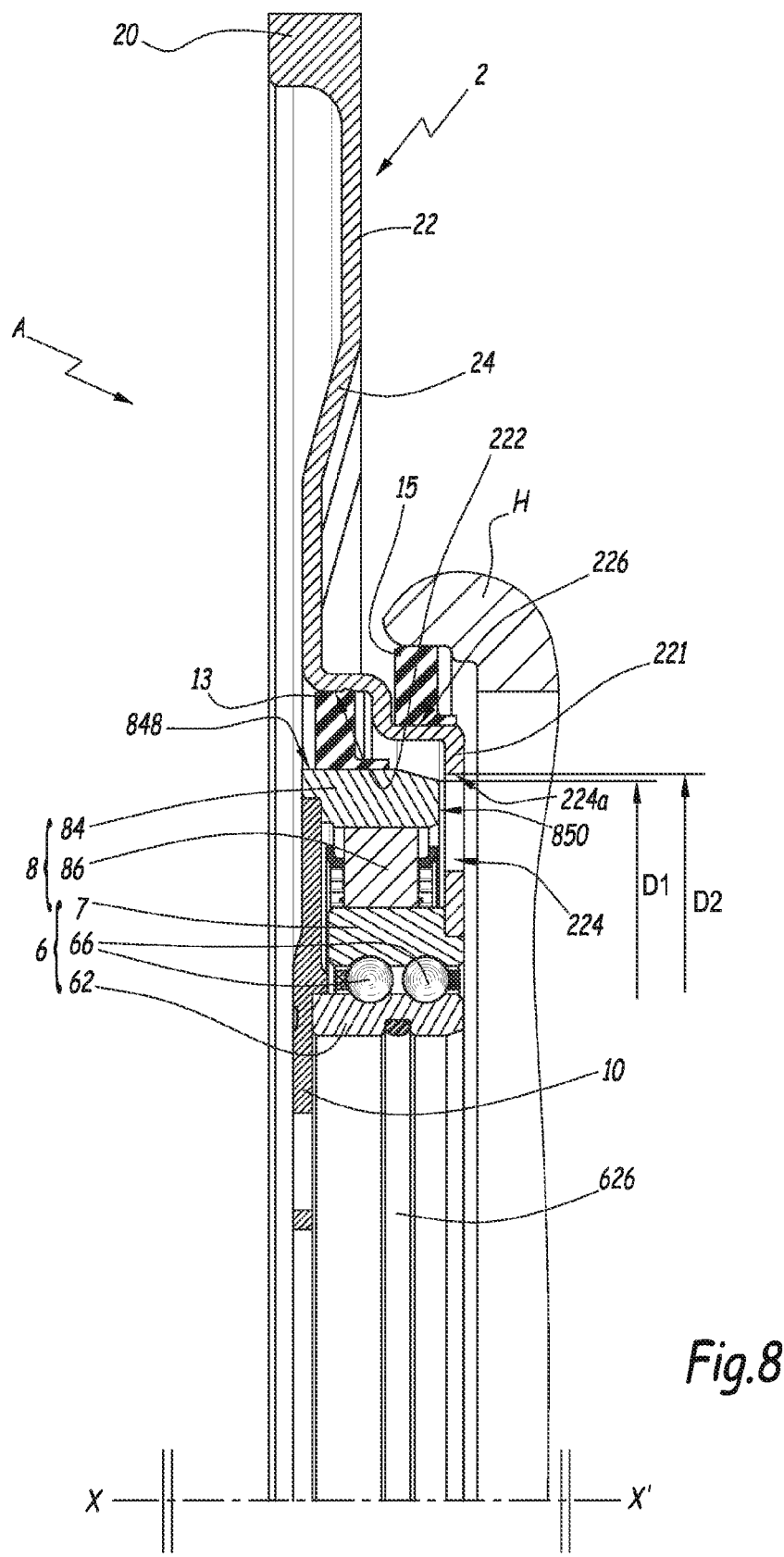
FIG. 8 is a view similar to FIG. 2 and at a larger scale, of a torque transmission mechanism according to a second embodiment of the invention.

A second embodiment of the invention is represented on FIG. 8. In this embodiment, elements similar to first embodiment have the same references and work in the same way. Only the differences with respect to the first embodiment are detailed hereafter.

In this embodiment, flange 22 and gear side portion 20 are made of one part. In such case, flange 22 is a monolithic part and is therefore less costly to produce, as it does not need assembling and welding operations for attaching a flange and a distinct ring gear. Such a monolithic flange 22 is also lighter than the devices of the prior art.

In the embodiment of FIG. 8, on a portion extending between gear side portion 20 and inner surface 222, flange 22 comprises a frustoconical stiffening portion 24, which permits to increase the mechanical resistance of flange 22 to deformations.

As represented on FIG. 8 only, even if this can be applied to the first embodiment, torque transmission mechanism A comprises a sealing gasket 15 disposed between a housing H of the internal combustion engine and an outer surface 226 of flange 22. Sealing gasket 15 is on a side of gear ring 2 opposed to sealing gasket 13.

Frustoconical portion 24 permits to create an axial space which allows to offset sealing gaskets 13 and 15 with respect to each other along axis X-X'. Sealing gaskets 13 and 15 are each mounted on a tubular portion of flange 22 having a different outer diameter, so that the radial dimension of the ensemble of sealing gaskets 13 and 15 is less than if sealing gaskets 13 and 15 were radially stepped as commonly known from the prior art, for instance from US-A-2008/121202. This improves the radial compactness of the central portion of torque transmission mechanism A.

The features of the previously described embodiments and variants can be combined within the scope of the invention.

What is claimed is:

1. A torque transmission mechanism for an internal combustion engine, adapted to transmit a starting torque from a starter motor to a crankshaft of the internal combustion engine, the torque transmission mechanism comprising:
   a ring gear that transmits the starting torque;
   a one-way clutch disposed between the ring gear and the crankshaft, the one-way clutch including an inner ring and an outer ring, the ring gear comprising lubrication holes adapted to allow lubricant to go from the internal combustion engine towards the one-way clutch, the one-way clutch further including a plurality of sprags disposed between the outer ring and the inner ring; and
   at least one sealing element adapted to prevent lubricant from passing between an outer surface of the outer ring of the one-way clutch and an inner surface of the ring gear,
   wherein the outer ring of the one-way clutch comprises a chamfered surface inclined with respect to a central axis of the torque transmission mechanism, the chamfered surface diverging with respect to the central axis of the torque transmission mechanism from the lubrication holes of the ring gear towards the sealing element,
   wherein a radially-inner extent of at least one of the lubrication holes is aligned with at least one of the plurality of sprags, and
   wherein a radially-outer extent of the at least one of the lubrication holes is radially outward of a radially-inner extent of the chamfered surface.

2. The torque transmission mechanism according to claim 1, wherein the chamfered surface is located at an intersection between the outer surface and an axial surface of the outer ring of the one-way clutch, said axial surface facing the ring gear parallely to the central axis of the torque transmission mechanism.

3. The torque transmission mechanism according to claim 2, wherein the intersection between the chamfered surface and the axial surface is at a distance to the central axis which is inferior to the distance to the central axis of an edge of at least one of the lubrication holes.

4. The torque transmission mechanism according to claim 1, wherein the ring gear is integral with the outer ring of the one-way clutch.

5. The torque transmission mechanism according to claim 1, further comprising a second sealing element that is disposed between and configured to seal with a flange of the ring gear and a portion of a housing that is radially outward of a portion of the flange, wherein the second sealing element is axially offset from the at least one sealing element and is radially overlapping therewith.

6. The torque transmission mechanism according to claim 1, wherein the lubrication holes are configured to direct fluid toward the plurality of sprags.

7. The torque transmission mechanism according to claim 1, wherein the at least one sealing element is disposed between the outer ring of the one-way clutch and the ring gear.

\* \* \* \* \*